(12) United States Patent
Erickson et al.

(10) Patent No.: US 7,997,060 B2
(45) Date of Patent: Aug. 16, 2011

(54) ROCKET ENGINE POWER CYCLE

(75) Inventors: Christopher M. Erickson, Thousand Oaks, CA (US); James R. Lobitz, Oak Park, CA (US); William R. Bissell, Westlake Village, CA (US); David E. Hanks, West Hills, CA (US); Corey D. Brown, North Palm Beach, FL (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 856 days.

(21) Appl. No.: 11/928,204

(22) Filed: Oct. 30, 2007

(65) Prior Publication Data

US 2008/0053064 A1 Mar. 6, 2008

Related U.S. Application Data

(63) Continuation-in-part of application No. 11/625,440, filed on Jan. 22, 2007, now Pat. No. 7,334,396, which is a continuation of application No. 10/098,955, filed on Mar. 15, 2002, now Pat. No. 7,216,477.

(51) Int. Cl.
*F02K 9/46* (2006.01)

(52) U.S. Cl. ............... 60/259; 60/260; 60/266
(58) Field of Classification Search .......... 60/260, 60/266, 267, 257, 259
See application file for complete search history.

(56) References Cited

U.S. PATENT DOCUMENTS

| | | | |
|---|---|---|---|
| 2,900,168 A | 8/1959 | Nyborg | |
| 3,049,870 A | 4/1960 | Chamberlain | |
| 3,170,295 A * | 2/1965 | Dryden | 60/39.48 |
| 3,516,254 A | 6/1970 | Hammond | |
| 4,583,362 A | 4/1986 | Wagner | |
| 5,052,176 A | 10/1991 | Labatut et al. | |
| 5,101,622 A | 4/1992 | Bond | |
| 5,410,874 A | 5/1995 | Limerick | |
| 5,444,973 A | 8/1995 | Limerick et al. | |
| 6,052,987 A | 4/2000 | Dressler | |
| 6,769,242 B1 | 8/2004 | Balepin | |
| 7,216,477 B1 | 5/2007 | Erickson et al. | |
| 7,334,396 B2 * | 2/2008 | Erickson et al. | 60/259 |

* cited by examiner

*Primary Examiner* — Ehud Gartenberg
*Assistant Examiner* — Phutthiwat Wongwian
(74) *Attorney, Agent, or Firm* — Carlson Gaskey & Olds PC

(57) ABSTRACT

An expander heat exchanger cycle system provides a fuel or oxidizer routed through a heat exchanger to cool and condense a coolant/turbine drive fluid.

5 Claims, 2 Drawing Sheets

ROCKET ENGINE POWER CYCLE

CROSS-REFERENCE TO RELATED APPLICATIONS

The present application is a continuation-in-part of U.S. patent application Ser. No. 11/625,440 filed on Jan. 22, 2007 now U.S. Pat. No. 7,334,396 which is a continuation of U.S. patent application Ser. No. 10/098,955 filed on Mar. 15, 2002 now U.S. Pat. No. 7,216,477.

BACKGROUND OF THE INVENTION

The present invention relates to propulsion systems, and more particularly to an expander heat exchanger cycle system therefore.

A rocket engine provides propulsion by combusting propellants, such as fuel and an oxidizer, at high pressure. The combustion of the fuel and the oxidizers provide combustion gases which are expelled through a nozzle at high velocity to produce thrust.

A turbopump includes turbines which drive pumps that pump fuel and oxidizer to the combustion chamber of the rocket engine. High pressure gases power the turbines. In order to produce the high pressure gases, combustion devices such as pre-burners initially heat or combust certain propellants, which may be in a heat exchange relationship with the combustion chamber to transfer the high pressure gases therefrom to the turbomachinery. This, typically, requires the turbines to withstand high pressures and temperatures. In addition, a seal system is required to prevent pre-mixture of the propellants as pre-mixture may produce a system failure. The seal system is typically purged with a purge gas which is consumed in the seal system. The purge gas may be under relatively high pressure, which may further complicate the engine.

Accordingly, it is desirable to provide relatively low pressure and low temperature system to communicate power propellants to a rocket engine.

SUMMARY OF THE INVENTION

An expander heat exchanger cycle system according to an exemplary aspect of the present invention provides a fuel or oxidizer routed through a heat exchanger to cool and condense a coolant/turbine drive fluid. The power to drive the turbopump is extracted from the combustor and nozzle cooling circuits by the coolant/turbine drive fluid which is subsequently cooled and condensed (after powering the turbines) in the heat exchanger then pumped back up to pressure for recirculation.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
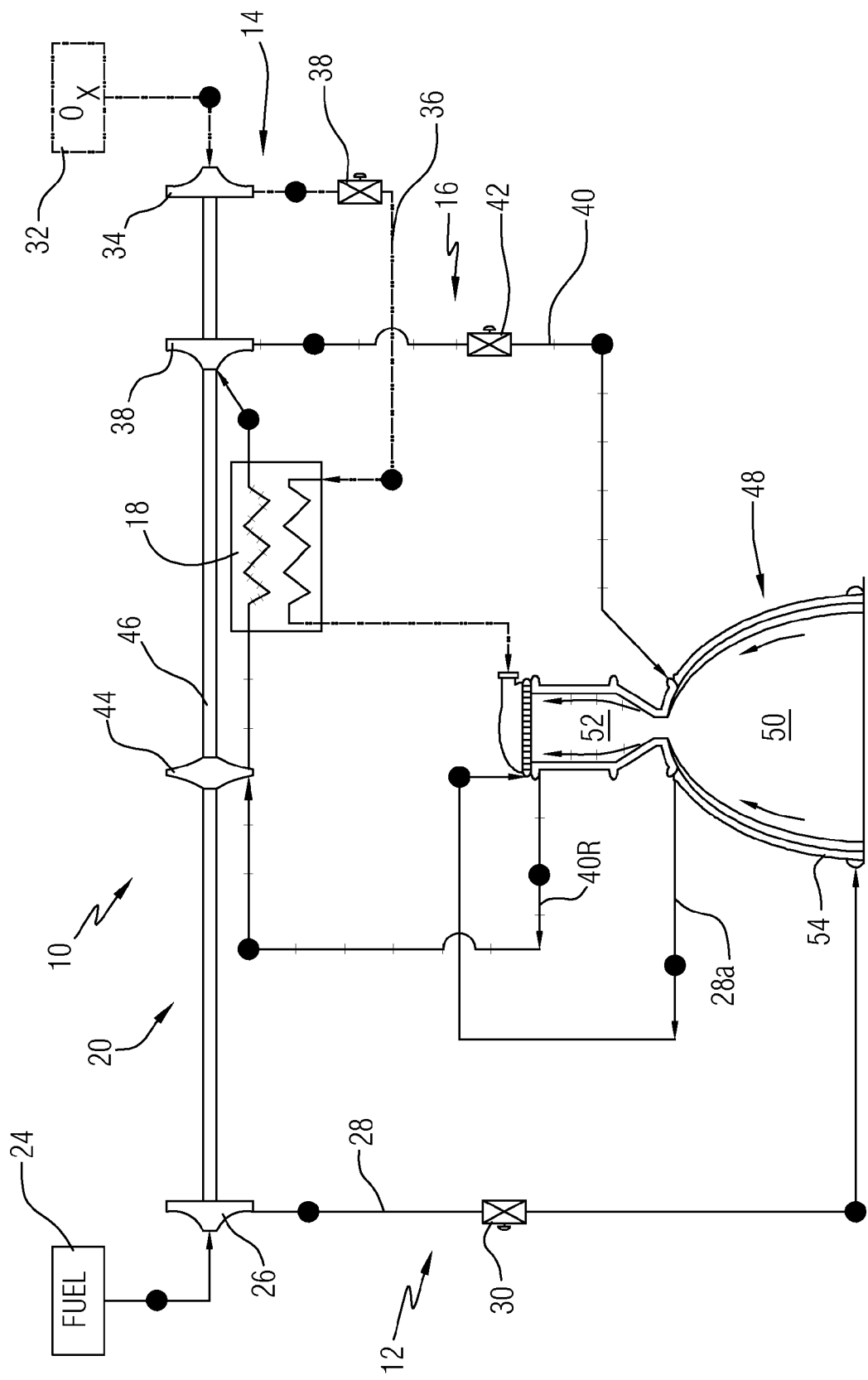
FIG. 1 is a schematic block diagram of an expander heat exchanger cycle system.

FIG. 1 schematically illustrates an expander heat exchanger cycle system ("Ex-Hex" system) 10. The "Ex-Hex" system 10 generally includes a fuel system 12, an oxidizer system 14, a coolant system 16, a heat exchanger 18 and a turbopump 20 to communicate power propellants to a combustor such as the disclosed rocket engine. It should be understood that although the combustor disclosed in the illustrated embodiment is a rocket engine, other rocket engine types, airbreathing engines, hypersonics and power generators will also benefit from the present invention.

The fuel system 12 includes a fuel supply 24 which provides a fuel as one power propellant of the Ex-Hex system 10. The fuel system 12 generally includes a fuel pump 26 and at least one fuel transport line 28 having at least one valve 30. The fuel supply 24 may supply any fuel utilized in a rocket engine, such as kerosene.

The oxidizer system 14 includes an oxidizer supply 32 which supplies an oxidizer as a second propellant of the Ex-Hex system 10. The oxidizer system 14 generally includes an oxidizer pump 34 which pumps the oxidizer through at least one oxidizer transport line 36 having at least one valve 38. The oxidizer supply 32 may supply any oxidizer utilized in a rocket engine, such as oxygen.

The coolant system 16 includes a coolant pump 38 which pumps a coolant/turbine drive fluid through at least one coolant transport line 40 having at least one valve 42. Both the oxidizer transport line 36 and the coolant transport line 40 communicate through the heat exchanger 18.

The turbopump 20 generally includes a turbine 44, the fuel pump 26, the oxidizer pump 34 and the coolant pump 38 on a common drive shaft 46 which interconnects the turbine 44 with each of the pumps 26, 34 and 38. When the turbine 44 is powered, the drive shaft 46 rotates and drives each of the pumps 26, 34 and 38. Therefore, the single turbine 44 powers each of the pumps 26, 34 and 38. It should be understood that a multiple drive shaft arrangement may be utilized (FIG. 2) in addition or alternatively to the single drive shaft arrangement.

A rocket engine 48 includes a nozzle 50 and a combustion chamber 52 which generally defines a thrust chamber assembly which may be at least partially surrounded by a cooling jacket 54. The cooling jacket 54 includes a multiple of channels through which a coolant may flow. The cooling jacket 54 may surround the nozzle 50, the combustion chamber 52 or any portion or combination of the thrust chamber assembly to provide cooling therefore. The combustion chamber 52 receives the fuel and the oxidizer to be combusted then expelled as combusted gases through the nozzle 50 to generate thrust from the rocket engine 48.

During operation of the Ex-Hex system 10, the fuel is communicated from the fuel pump 26 through the fuel transport line 28 at a pressure generally between about 3000 and 4000 absolute pounds per square inch (psia), wherein the pressure per square inch is measured relative to a complete vacuum, and a temperature between about 520 degrees Rankin (° R) and about 600 degrees Rankin (° R) (about 60° F. and about 140° F. or about 15° C. and about 60° C.). The fuel travels through the fuel transport line 28 to the cooling jacket 54. From the cooling jacket 54, the fuel has dropped in pressure to generally between about 2500 and the 3500 psia and increased in temperature to between about 600° R and about 760° R (about 141° F. and about 301° F. or about 60° C. and about 149° C.) before the fuel enters the combustion chamber 52 though line 28a. This decrease in pressure and increase in temperature indicates a cooling of the thrust chamber assembly, to reduce stress thereon.

The heat exchanger 18 transfers heat and energy from the coolant to the oxidizer. This heat exchange facilitates cooling of the coolant and a temperature increase to the oxidizer. This heat exchange generally begins when the coolant exits the coolant pump 38 at a pressure of between about 3500 and 4500 psia and at a temperature of between about 120° R to about 270° R (about −339° F. and about −189° F., or about −206° C. and about −123° C.), at which the coolant may be considered a cooled coolant state. The coolant, from the coolant pump 38, enters the cooling jacket 54 of the engine 48. The coolant is thereby in a heat exchange relationship with the thrust chamber assembly, which increases coolant temperature, indicating an increased thermal energy, and a decreases coolant pressure. The coolant may evaporate into a gas then exit the thrust chamber assembly adjacent the combustion chamber 52 through the coolant transport lines 40R.

The coolant exits the combustion chamber 52 through the coolant transport line 40R, at a pressure of approximately between 2500 and 3200 psia at a temperature of between about 800 and 1000 degrees R (about 341° F. and about 541° F., or about 171° C. and about 282° C.) which may be considered a hot coolant state. The hot coolant is transported by the coolant transport line 40R to the turbopump 20 to power the turbine 44 and drive each pump 26, 34, and 38. After being depleted of some energy, the hot coolant exits the turbine 44 at a pressure between about 280 and about 390 psia and a temperature of between about 500° R and about 700° R (about 41° F. and about 241° F., or about 4° C. and about 115° C.).

The hot coolant enters the heat exchanger 18 to transfer further energy thereto. From the heat exchanger 18, the coolant has a pressure between about 180 and 280 psia and a temperature between about 150° R and about 250° R (about −309° F. and about −209° F., or about −189° C. and about −134° C.). The coolant may now be considered as essentially returned to the cooled state. The coolant is then pumped into coolant transport line 40 by the coolant pump 38 to re-circulate. The coolant is thereby essentially never depleted in the Ex-Hex system 10. The coolant cools the thrust chamber assembly and then is cooled and condensed to transfer significant accumulated heat energy to the turbine 44 and the heat exchanger 18. Transfer of energy from the hot coolant condenses or re-cools the coolant.

The oxidizer pump 34 pumps oxidizer at an initial pressure of between about 2500 and 3500 psia and an initial temperature between about 115° R and about 215° R (about −34° F. and about −244° F., or about −209° C. and about −153° C.) so that the oxidizer may be considered as a cool oxidizer. The oxidizer is pumped through the heat exchanger 18 by the pump 34 to receive at least some of the heat energy released by the hot coolant. That is, the heat exchanger 18 transfers thermal energy between the relatively hot coolant and the relatively cold oxidizer. After exiting the heat exchanger 18, the oxidizer has become a hot oxidizer with a pressure of between about 2500 and 3200 psia and a temperature between about 220° R and about 300° R (about −239° and about −159° F., or about −150° C. and about −106° C.). The hot oxidizer is then communicated into the combustion chamber 52 to oxidize the fuel for combustion.

The heat exchanger 18 increases the temperature of the oxidizer which enhances combustion efficiency in the combustion chamber 52. The coolant in the Ex-Hex system 10, which gains heat and energy by cooling the thrust chamber assembly of the engine 48, transfers a portion of that heat energy first to the turbine 44 to power the pumps 26, 34, and 38 then transfers additional heat energy to the oxidizer through the heat exchanger 18. That is, the coolant in the Ex-Hex system 10 is in a heat exchange relationship with the thrust chamber assembly of the engine 48, the turbopump 20 and the oxidizer.

Location of the coolant pump 38 and the turbine 44, both containing coolant between the fuel pump 26 and the oxidizer pump 34 minimizes or prevents fuel and oxidizer pre-mixture before injection into the combustion chamber 52. The coolant provides energy to the oxidizer through the heat exchanger 18 such that the oxidizer and the fuel need not mix before entering the combustion chamber 52. Reducing the potential for oxidizer and fuel to pre-mix before entering the combustion chamber 52 increases the longevity and reduces the complexity of the Ex-Hex system 10.

The coolant need be the only compound which enters the Ex-Hex system 10 at a relatively high pressure in this embodiment and may be any appropriate inert compound such as nitrogen. Because the coolant is a relatively inert material, the coolant pump 38 need not require a complex seal system as coolant escape is a relatively benign event.

Only the oxidizer is heated within the heat exchanger 18 as the fuel is communicated directly to the combustion chamber 52. Since fuel does not enter the heat exchanger 18, the heat exchanger 18 need not be reinforced as no combustion should occur therein. Since the oxidizer does not enter the heat exchanger 18 at a high pressure or temperature, the heat exchanger 40 may be of a relatively uncomplicated design that need not resist extremely high pressures and temperatures.

The Ex-Hex system 10 may use any coolant to cool the engine 48 or any portion thereof to transfer energy to other propellants communicated to the combustion chamber 52. Moreover, the Ex-Hex system 10 facilitates operation of any rocket engine 48 which requires that one or more propellants be heated prior to combustion. The Ex-Hex system 10 may be utilized with numerous rocket engine designs which require heated fuels and/or oxidizers and that any system to combust a fuel may use or be adapted to use the Ex-Hex system 10.

Figure 2:
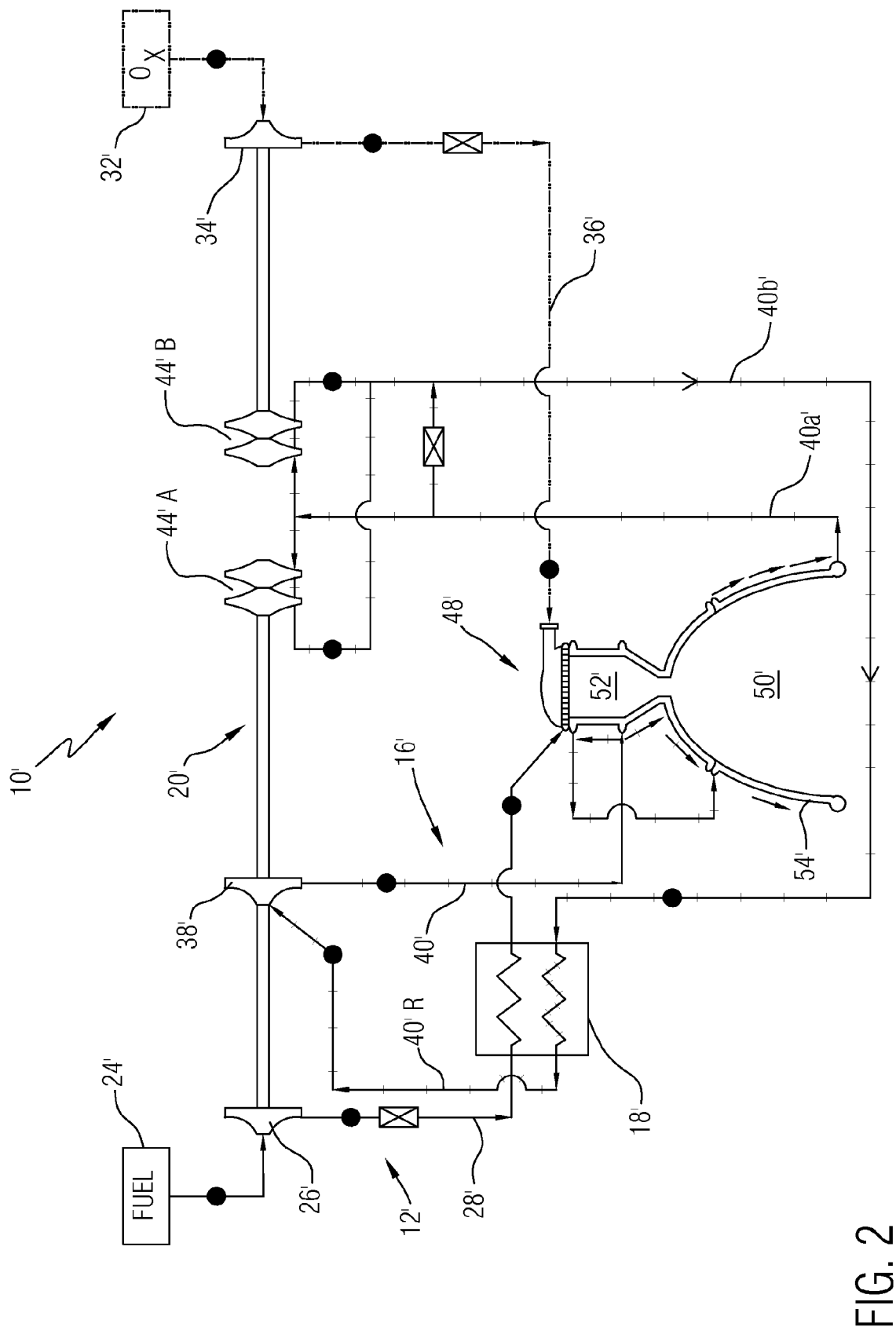
FIG. 2 is a schematic block diagram of another expander heat exchanger cycle system.

Referring to FIG. 2, another embodiment of the Ex-Hex system 10' includes liquid Oxygen as the oxidizer, and Methane as both the fuel and the coolant. One primary difference in this embodiment is that only fuel is transported through the heat exchanger 18' rather than oxidizer and coolant. That is, the fuel system 12' and the coolant system 16' may be separate loops but both utilize the same fluid. The thermodynamics of this embodiment is essentially that of the FIG. 1 embodiment in that the power to drive the turbopump 20 is extracted from the cooling jacket 54' circuits by the coolant. The coolant fluid is subsequently cooled and condensed (after powering the turbines) in the heat exchanger 18' and pumped back up to pressure for recirculation.

During operation of this embodiment the Ex-HEX system 10', fuel (methane) is communicated from the fuel pump 26' through the fuel transport line 28' at approximately 2500 absolute pounds per square inch (psia), wherein the pressure per square inch is measured relative to a complete vacuum, and a temperature of approximately 225 degrees Rankin (R). The fuel then travels through the heat exchanger 18' which indirectly absorbs heat from the coolant fluid which decreases in pressure and increases in temperature to exit the heat exchanger 18' at approximately 2000 psia and 435 degrees R. The fuel is then injected into the main combustor 52' for reaction with the oxidizer.

The coolant (also methane in the FIG. 2 embodiment) exits the coolant pump 38' and enters the coolant transport line 40' at a pressure of approximately 3900 psia and 375 degrees R (liquid state) then enters the cooling jacket 54'. The coolant increases in temperature and may evaporate into a gas as a result of extracting heat through the cooling jacket 54'. The coolant then enters the coolant transport lines 40a' at approximately 3390 psia and 1080 degrees R and may now be considered as in a hot coolant state. The hot coolant continues along the coolant line 40a', to power turbines 44A', 44B' and drive pumps 26', 34', 38'. After transfer of at least a portion of the thermal energy, the coolant exits the turbines 44A', 44B' at approximately 480 psia and 815 degrees R and is recombined into coolant transport line 40b'.

The hot coolant then enters the heat exchanger 18' to transfer a further portion of energy to the incoming methane fuel through the heat exchanger 18'. After exiting the heat exchanger 18', the coolant has a pressure of approximately 460 psia and a temperature of approximately 315 degrees R. The coolant may now be considered as returned to a cool liquid state again to enter the coolant pump 38' through coolant transport line 40'R. The coolant is then pumped back into the coolant line 40' to re-circulate. In this way, the coolant is essentially never depleted.

The coolant continually cools the engine 48' and then is cooled and condensed while at least a portion of the accumulated heat energy is transferred to the turbines 44A', 44B' and the heat exchanger 18'. The transfer of thermal energy from the hot coolant (heated fuel) to the fuel in the heat exchanger 18' and the turbines 44A', 44B' re-cools and condenses the coolant.

The oxidizer pump 34' pumps oxidizer (liquid oxygen) from an initial inlet pressure of approximately 60 psia and temperature of approximately 160 degrees R to a pump exit pressure of approximately 2110 psia and temperature of approximately 175 degrees R where it enters the oxidizer transport line 36'. The oxidizer then feeds into the combustion chamber 52 to oxidize the fuel.

The FIG. 2 embodiment also provides a "split-shaft" turbopump arrangement in which there are two turbines 44A', 44B'; turbine 44B' to drive the oxidizer pump 34', and turbine 44A' to drive the fuel pump 26' and the coolant pump 38'. The split shaft arrangement facilitates optimal shaft rotational speeds to maximize pump and turbine efficiencies to deliver relatively lower pump discharge pressures and reduced engine weight. In this particular embodiment, in which methane was used as the tertiary drive fluid (same compound as the engine fuel propellant), a seal system between turbine 44'B and oxidizer pump 34' may be required to isolate the methane from potential mixing with the oxidizer propellant. If an inert tertiary fluid such as nitrogen (as in FIG. 1 configuration) was used in this embodiment, a seal system would not be necessary.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An expander heat exchanger cycle system comprising:
   a fuel system which communicates a fuel to a combustor;
   an oxidizer system which communicates an oxidizer to the combustor;
   a coolant system which communicates a coolant into a heat exchange relationship with said combustor;
   a heat exchanger system in communication with said coolant system and one of said fuel system and said oxidizer system; and
   a turbopump at least partially powers at least one of said fuel system, said oxidizer system and said coolant system, said turbopump powered at least in part by transfer of thermal energy between said coolant and said turbopump, said turbopump includes a common shaft with a first turbine, a coolant pump, a fuel pump and an oxidizer pump, said coolant pump forms a barrier by being located between said fuel system and said oxidizer system to inhibit mixing of said fuel and said oxidizer before said fuel and said oxidizer enter said combustor.

2. The system as recited in claim 1, wherein said turbopump includes a first shaft and a second shaft, said first shaft includes a first turbine, said coolant pump and a fuel pump, said second shaft includes a second turbine and an oxidizer pump.

3. The system as recited in claim 1, wherein said combustor includes a thrust chamber assembly.

4. The system as recited in claim 1, wherein said combustor includes a rocket engine nozzle.

5. The system as recited in claim 1, wherein said combustor includes a combustion chamber.

\* \* \* \* \*